(12) United States Patent
Kim et al.

(10) Patent No.: US 11,804,331 B2
(45) Date of Patent: Oct. 31, 2023

(54) MULTILAYER ELECTRONIC COMPONENT

(71) Applicant: SAMSUNG ELECTRO-MECHANICS CO., LTD., Suwon-si (KR)

(72) Inventors: Hyoung Uk Kim, Suwon-si (KR); Seung In Baik, Suwon-si (KR); Ji Su Hong, Suwon-si (KR); Eun Ha Jang, Suwon-si (KR); Jae Sung Park, Suwon-si (KR); Chung Eun Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 190 days.

(21) Appl. No.: 17/375,323

(22) Filed: Jul. 14, 2021

(65) Prior Publication Data

US 2022/0157530 A1 May 19, 2022

(30) Foreign Application Priority Data

Nov. 18, 2020 (KR) .................. 10-2020-0154854

(51) Int. Cl.
 *H01G 4/30* (2006.01)
 *H01G 4/008* (2006.01)
 (Continued)

(52) U.S. Cl.
 CPC .............. *H01G 4/30* (2013.01); *H01G 4/008* (2013.01); *H01G 4/012* (2013.01); *H01G 4/1218* (2013.01)

(58) Field of Classification Search
 CPC ...... H01G 4/008; H01G 4/012; H01G 4/1209; H01G 4/1218; H01G 4/30
 See application file for complete search history.

(56) References Cited

U.S. PATENT DOCUMENTS

2012/0262840 A1* 10/2012 Koizumi ............... H01G 4/12
 361/321.2
2014/0022692 A1 1/2014 Yoon et al.
 (Continued)

FOREIGN PATENT DOCUMENTS

| JP | 2012-227260 A | 11/2012 |
| KR | 10-2014-0012493 A | 2/2014 |
| KR | 20190116113 A | * 10/2019 |

OTHER PUBLICATIONS

H. Chazono, et al., "dc-Electrical Degradation of the BT-Based Material for Multilayer Ceramic Capacitor with Ni Internal Electrode: Impedance Analysis and Microstructure," The Japan Society of Applied Physics, vol. 40, 2001.

*Primary Examiner* — Nathan Milakovich
(74) *Attorney, Agent, or Firm* — Morgan, Lewis & Bockius LLP (57) ABSTRACT

A multilayer electronic component includes: a body including dielectric layers; side margin portions disposed on side surfaces of the body, respectively; and external electrodes disposed on end surfaces of the body, respectively. The body includes a capacitance forming portion including internal electrodes disposed alternately with the dielectric layers and cover portions disposed on upper and lower surfaces of the capacitance forming portion, respectively. Ga2/Ga1 is 0.8 or more and less than 1.0 and Ga2/Gc1 is 0.8 or more and less than 1.0. a1 is a central portion of the capacitance forming portion, a2 is a boundary portion between the capacitance forming portion and the cover portion in the capacitance forming portion, and c1 is a boundary portion between the capacitance forming portion and the cover portion in the cover portion. Ga1, Ga2, and Gc1 are average sizes of dielectric grains at a1, a2, and c1, respectively.

20 Claims, 7 Drawing Sheets

(51) Int. Cl.
*H01G 4/012* (2006.01)
*H01G 4/12* (2006.01)

(56) References Cited

U.S. PATENT DOCUMENTS

| | | | |
|---|---|---|---|
| 2014/0211367 A1* | 7/2014 | Morita | H01G 4/30 |
| | | | 361/301.4 |
| 2014/0301013 A1* | 10/2014 | Kim | H01G 4/01 |
| | | | 29/25.03 |
| 2020/0402717 A1* | 12/2020 | Lee | H01G 2/02 |
| 2022/0139625 A1* | 5/2022 | Lee | H01G 4/012 |
| | | | 361/301.4 |
| 2022/0139632 A1* | 5/2022 | Kim | H01G 4/1227 |
| | | | 361/321.4 |
| 2022/0208455 A1* | 6/2022 | Nam | H01G 4/232 |

* cited by examiner

MULTILAYER ELECTRONIC COMPONENT

CROSS-REFERENCE TO RELATED APPLICATION(S)

This application claims benefit of priority to Korean Patent Application No. 10-2020-0154854 filed on Nov. 18, 2020 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), one of multilayer electronic components, is a chip-type condenser mounted on a printed circuit board of several electronic products such as an image device, for example, a liquid crystal display (LCD), a plasma display panel (PDP) or the like, a computer, a smartphone, a mobile phone, and the like, to serve to charge or discharge electricity therein or therefrom.

The multilayer ceramic capacitor may be used as components of various electronic apparatuses since it has a small size, implements high capacitance, and may be easily mounted. Recently, in accordance with miniaturization of components of the electronic apparatuses, demand for miniaturization and a capacitance increase of the multilayer ceramic capacitor has increased.

In order to miniaturize a multilayer ceramic capacitor and increase capacitance of the multilayer ceramic capacitor, a technology capable of forming an internal electrode and a dielectric layer at small thicknesses is required.

However, as the thicknesses of the internal electrode and the dielectric layer are decreased, reliability of the multilayer ceramic capacitor may be decreased.

SUMMARY

An aspect of the present disclosure may provide a multilayer electronic component of which reliability is improved.

Another aspect of the present disclosure may provide a multilayer electronic component of which breakdown voltage characteristics are improved.

Another aspect of the present disclosure may provide a multilayer electronic component of which capacitance dispersion is suppressed.

Another aspect of the present disclosure may provide a multilayer electronic component of which high-temperature lifespan characteristics are improved.

Another aspect of the present disclosure may provide a multilayer electronic component having high reliability, a small size, and high capacitance.

According to an aspect of the present disclosure, a multilayer electronic component may include: a body including a plurality of dielectric layers and having first and second surfaces opposing each other in a first direction, third and fourth surfaces connected to the first and second surfaces and opposing each other in a second direction, and fifth and sixth surfaces connected to the first to fourth surfaces and opposing each other in a third direction; side margin portions disposed on the fifth and sixth surfaces, respectively; and external electrodes disposed on the third and fourth surfaces, respectively. The body may include a capacitance forming portion including internal electrodes disposed alternately with the dielectric layers and cover portions disposed on upper and lower surfaces of the capacitance forming portion in the first direction, respectively. $Ga2/Ga1$ is 0.8 or more and less than 1.0 and $Ga2/Gc1$ is 0.8 or more and less than 1.0, in which a1 is a central portion of the capacitance forming portion, a2 is a boundary portion between the capacitance forming portion and the cover portion in the capacitance forming portion, c1 is a boundary portion between the capacitance forming portion and one of the cover portions in the one of the cover portions, $Ga1$ is an average size of dielectric grains at a1, $Ga2$ is an average size of dielectric grains at a2, and $Gc1$ is an average size of dielectric grains at c1.

According to an aspect of the present disclosure, a multilayer electronic component may include: a body including a plurality of dielectric layers and having first and second surfaces opposing each other in a first direction, third and fourth surfaces connected to the first and second surfaces and opposing each other in a second direction, and fifth and sixth surfaces connected to the first to fourth surfaces and opposing each other in a third direction; side margin portions disposed on the fifth and sixth surfaces, respectively; and external electrodes disposed on the third and fourth surfaces, respectively. The body may include a capacitance forming portion including internal electrodes disposed alternately with the dielectric layers and cover portions disposed on upper and lower surfaces of the capacitance forming portion in the first direction, respectively. $[(Gm1+Gc1)/2]/Ga1$ may be greater 0.8 and less than 1, in which a1 is a central portion of the capacitance forming portion, c1 is a boundary portion between the capacitance forming portion and one of the cover portions in the one of the cover portions, m1 is a boundary portion between one of the side margin portions and the capacity forming portion in the one of the side margin portions, $Ga1$ is an average size of dielectric grains at a1, $Gc1$ is an average size of dielectric grains at c1, and $Gm1$ is an average size of dielectric grains at m1.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

In the drawings, a first direction may be defined as a stacked direction or a thickness T direction, a second direction may be defined as a length L direction, and a third direction may be defined as a width W direction.

Multilayer Electronic Component

Figure 1:
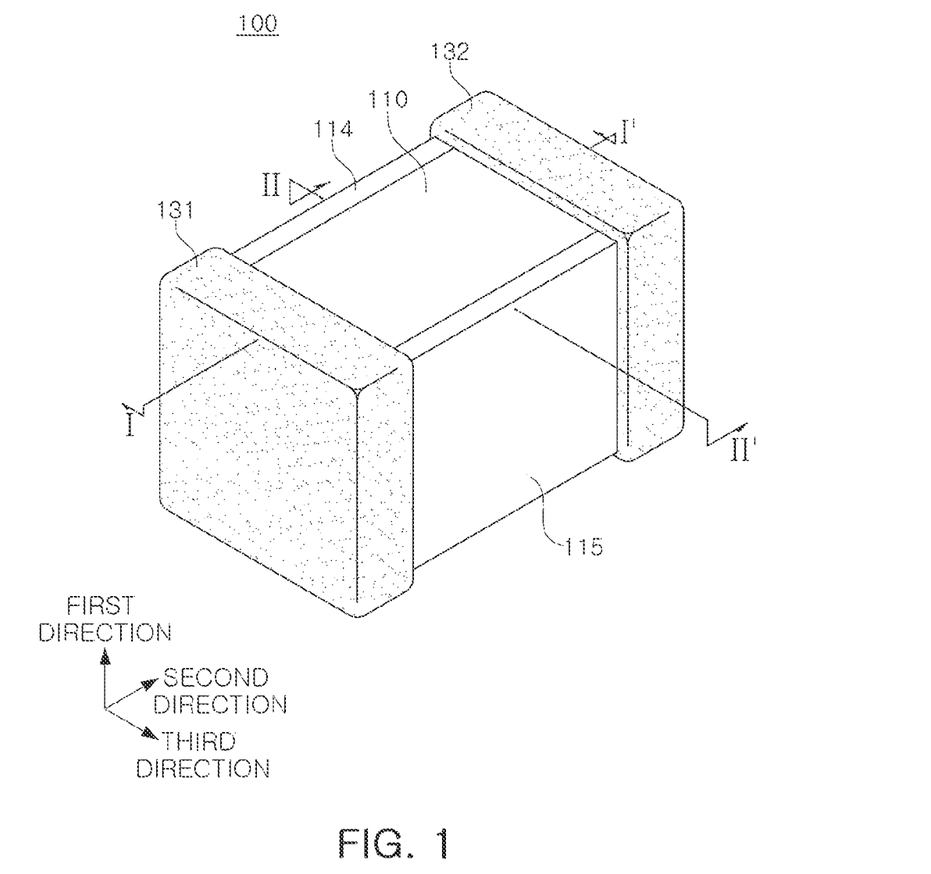
FIG. 1 is a schematic perspective view illustrating a multilayer electronic component according to an exemplary embodiment in the present disclosure.

FIG. 1 is a schematic perspective view illustrating a multilayer electronic component according to an exemplary embodiment in the present disclosure.

Figure 2:
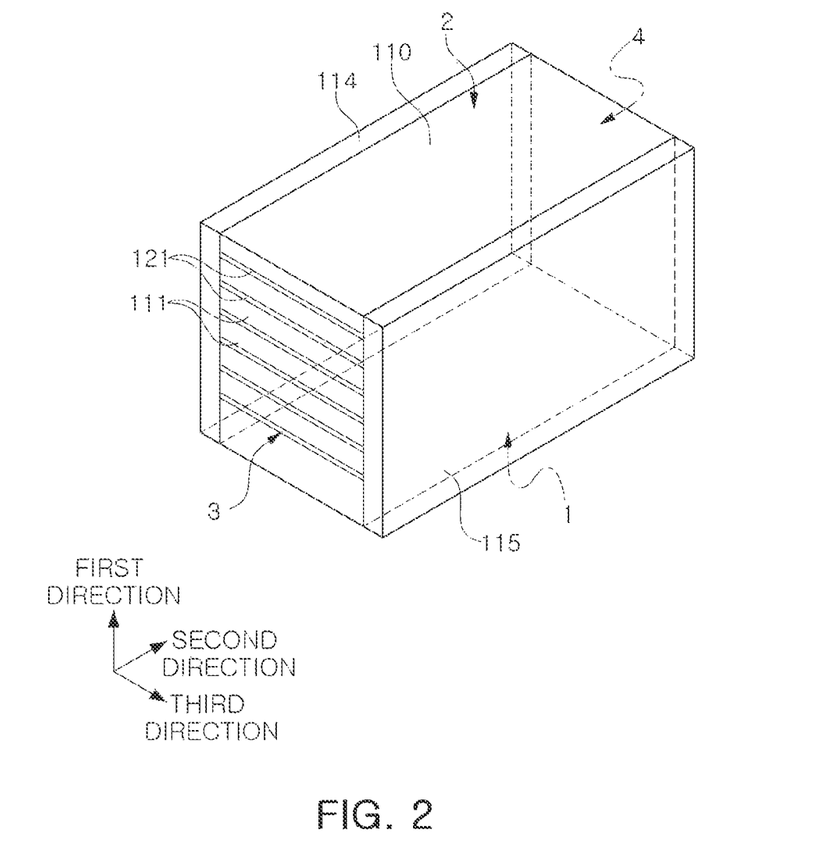
FIG. 2 is a perspective view illustrating a body in a state in which external electrodes are excluded from the multilayer electronic component of FIG. 1.

FIG. 2 is a perspective view illustrating a body in a state in which external electrodes are excluded from the multilayer electronic component of FIG. 1.

Figure 3:
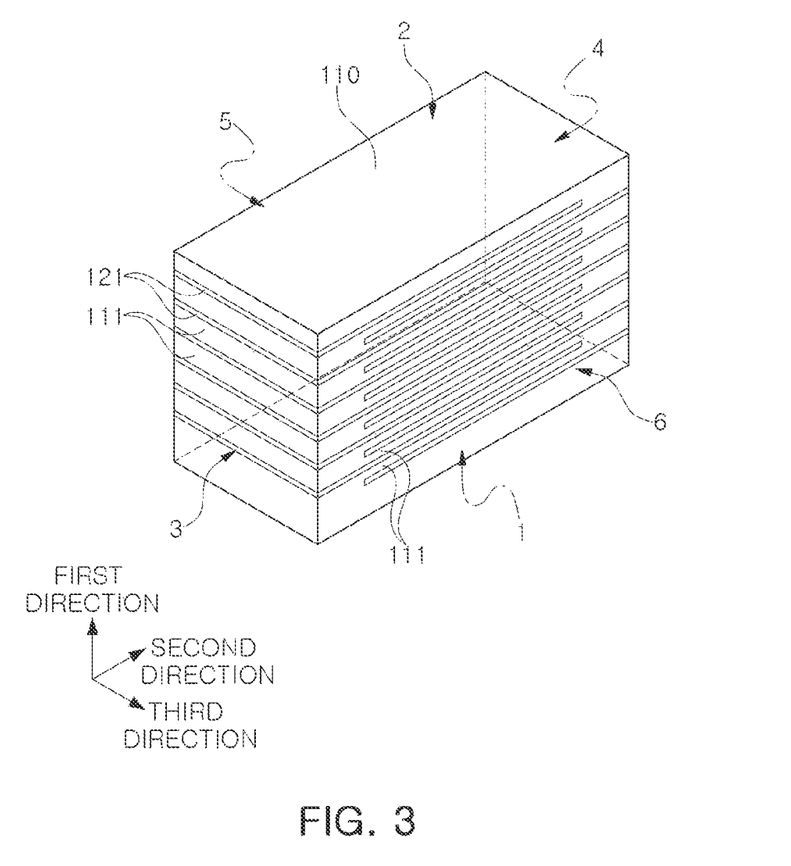
FIG. 3 is a perspective view illustrating the body in a state in which the external electrodes and side margin portions are excluded from the multilayer electronic component of FIG. 1.

FIG. 3 is a perspective view illustrating the body in a state in which the external electrodes and side margin portions are excluded from the multilayer electronic component of FIG. 1.

Figure 4:
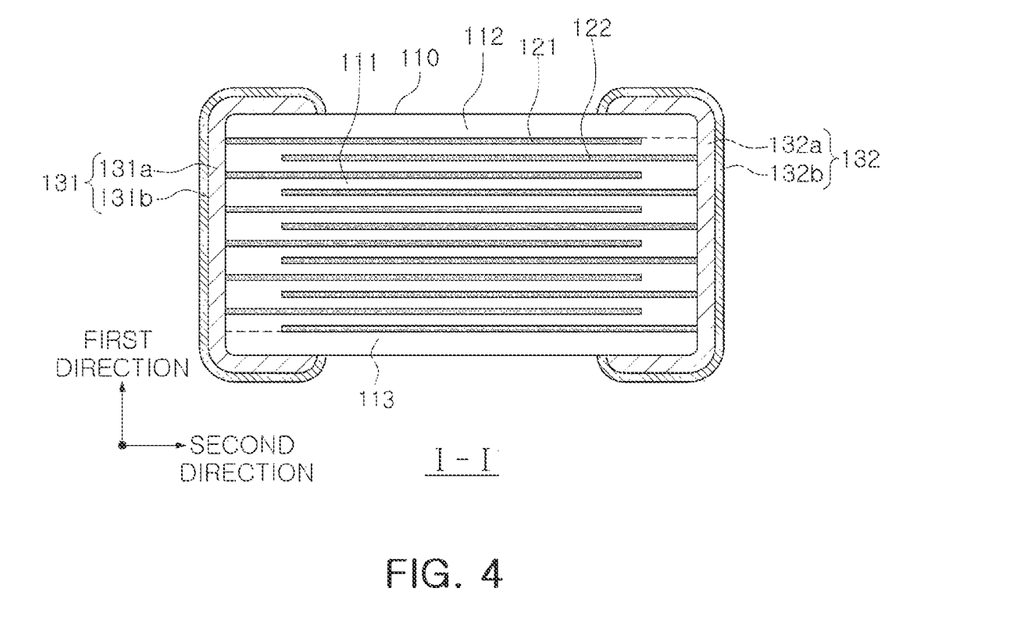
FIG. 4 is a cross-sectional view taken along line I-I' of FIG. 1.

FIG. 4 is a cross-sectional view taken along line I-I' of FIG. 1.

Figure 5:
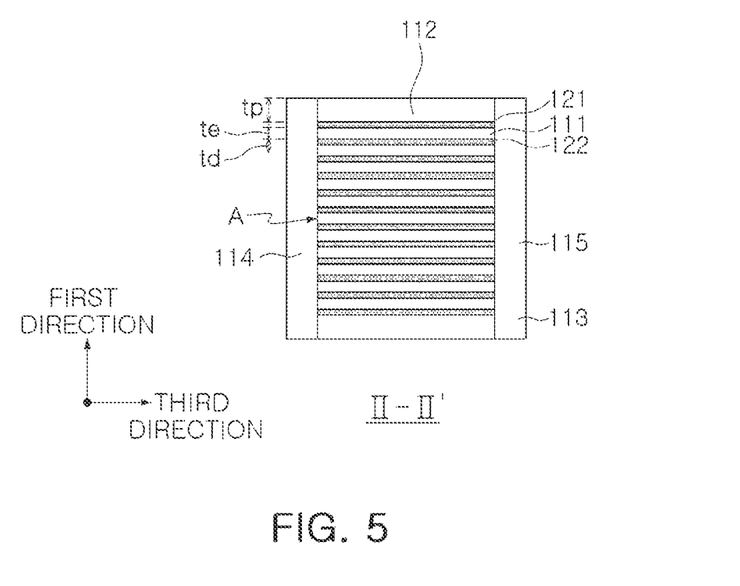
FIG. 5 is a cross-sectional view taken along line II-II' of FIG. 1.

FIG. 5 is a cross-sectional view taken along line II-II' of FIG. 1.

Figure 6:
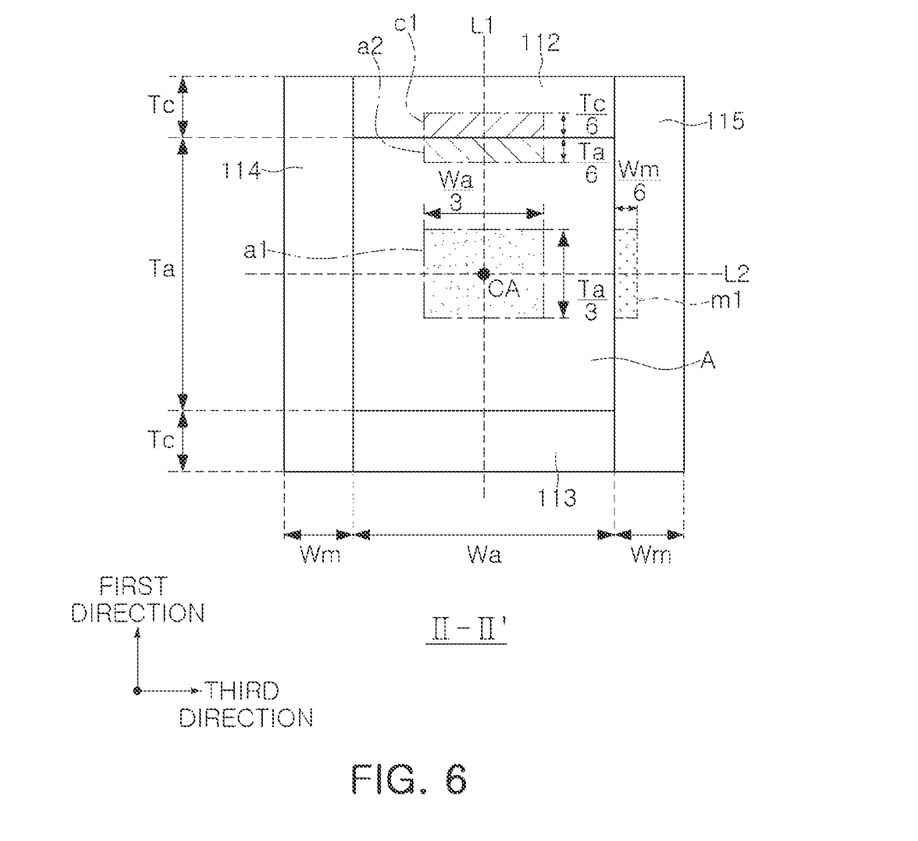
FIG. 6 is a schematic cross-sectional view illustrating FIG. 5 in order to describe components of the multilayer electronic component according to the present disclosure.

FIG. 6 is a schematic cross-sectional view illustrating FIG. 5 in order to describe components of the multilayer electronic component according to the present disclosure.

Hereinafter, a multilayer electronic component according to an exemplary embodiment in the present disclosure will be described in detail with reference to FIGS. 1 through 6.

A multilayer electronic component 100 according to an exemplary embodiment in the present disclosure may include: a body 110 including a plurality of dielectric layers 111 and having first and second surfaces 1 and 2 opposing each other in the first direction, third and fourth surfaces 3 and 4 connected to the first and second surfaces and opposing each other in the second direction, and fifth and sixth surfaces 5 and 6 connected to the first to fourth surfaces and opposing each other in the third direction; side margin portions 114 and 115 disposed on the fifth and sixth surfaces, respectively; and external electrodes 131 and 132 disposed on third and fourth surfaces, respectively. The body includes a capacitance forming portion A including internal electrodes 121 and 122 disposed alternately with the dielectric layers 111 and cover portions 112 and 113 disposed on upper and lower surfaces of the capacitance forming portion in the first direction, respectively, and Ga2/Ga1 is 0.8 or more and less than 1.0 and Ga2/Gc1 is 0.8 or more and less than 1.0 in which a1 is a central portion of the capacitance forming portion, a2 is a boundary portion between the capacitance forming portion and the cover portion in the capacitance forming portion, c1 is a boundary portion between the cover portion and the capacitance forming portion in the cover portion, Ga1 is an average size of dielectric grains at a1, Ga2 is an average size of dielectric grains at a2, and Gc1 is an average size of dielectric grains at c1.

The body 110 may include the dielectric layers 111 and the internal electrodes 121 and 122 alternately stacked therein.

A shape of the body 110 is not particularly limited, and may be a hexahedral shape or a shape similar to the hexahedral shape, as illustrated in the drawings. Although the body 110 does not have a hexahedral shape having perfectly straight lines due to shrinkage of ceramic powders included in the body 110 in a sintering process, the body 110 may have a substantially hexahedral shape.

The body 110 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 may be in a sintered state, and adjacent dielectric layers 111 may be integrated with each other so that boundaries therebetween are not readily apparent without using a scanning electron microscope (SEM).

According to an exemplary embodiment in the present disclosure, a raw material of the dielectric layer 111 is not particularly limited as long as sufficient capacitance may be obtained. For example, a barium titanate-based material, a lead composite perovskite-based material, a strontium titanate-based material, or the like, may be used as the raw material of the dielectric layer 111. The barium titanate-based material may include $BaTiO_3$-based ceramic powders. Examples of the $BaTiO_3$-based ceramic powders may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), or the like, is partially solid-dissolved in $BaTiO_3$.

A material of the dielectric layer 111 may include various ceramic additives, organic solvents, binders, dispersants, and the like, added to powders such as barium titanate ($BaTiO_3$) powders, or the like, according to an object of the present disclosure.

Meanwhile, a thickness td of the dielectric layer 111 does not need to be particularly limited.

However, in general, when the dielectric layer is formed to have a small thickness less than 0.6 μm, in particular, when a thickness of the dielectric layer is 0.45 μm or less, breakdown voltage and high-temperature lifespan characteristics of the multilayer electronic component may be deteriorated.

As described later, according to an exemplary embodiment in the present disclosure, capacitance dispersion may be suppressed and breakdown voltage and high-temperature lifespan characteristics of the multilayer electronic component may be improved by controlling average sizes of dielectric grains for each position, and sufficient reliability of the multilayer electronic component may thus be secured even when the thickness of the dielectric layer is 0.45 μm or less.

Therefore, when the thickness of the dielectric layer 111 is 0.45 μm or less, a reliability improving effect of the multilayer electronic component according to the present disclosure may be more remarkable.

The thickness td of the dielectric layer 111 may refer to an average thickness of the dielectric layer 111 disposed between the first and second internal electrodes 121 and 122.

The average thickness of the dielectric layer 111 may be measured from an image obtained by scanning a cross section of the body 110 in the length and thickness directions (L-T) with a scanning electron microscope (SEM).

For example, with respect to any dielectric layer extracted from an image obtained by scanning a cross section of the body 110 in the first and second directions (the thickness and length directions) cut at a central portion of the body 110 in the third direction (the width W direction) with the scanning electron microscope (SEM), thicknesses of the dielectric layer may be measured at thirty points arranged at equal intervals in the length direction to obtain an average value of the measured thicknesses.

The thicknesses of the dielectric layer measured at the thirty points arranged at the equal intervals may be measured in the capacitance forming portion A referring to a region in which the first and second internal electrodes 121 and 122 overlap each other.

Other methods and/or tools appreciated by one of ordinary skill in the art, even if not described in the present disclosure, may also be used.

The body 110 may include the capacitance forming portion A disposed in the body 110 and forming capacitance by including the first internal electrodes 121 and the second internal electrodes 122 disposed to face each other with each of the dielectric layers 111 interposed therebetween and the cover portions 112 and 113 formed on upper and lower surfaces of the capacitance forming portion A in the first direction, respectively.

In addition, the capacitance forming portion A, which contributes to forming capacitance of a multilayer ceramic capacitor, may be formed by repeatedly stacking a plurality of first and second internal electrodes 121 and 122 with each of the dielectric layers 111 interposed therebetween.

The upper cover portion 112 and the lower cover portion 113 may be formed by stacking a single dielectric layer or two or more dielectric layers on the upper and lower surfaces of the capacitance forming portion A in the thickness direction, respectively, and may basically serve to prevent damage to the internal electrodes due to physical or chemical stress.

The upper cover portion 112 and the lower cover portion 113 may not include the internal electrodes, and may include the same material as the dielectric layer 111.

That is, the upper cover portion 112 and the lower cover portion 113 may include a ceramic material such as a barium titanate ($BaTiO_3$)-based ceramic material.

Meanwhile, a thickness of each of the cover portions 112 and 113 does not need to be particularly limited. However, the thickness tp of each of the cover portions 112 and 113 may be 20 μm or less in order to more easily achieve miniaturization and a capacitance increase of the multilayer electronic component.

In addition, the side margin portions 114 and 115 may be disposed on side surfaces of the capacity forming portion A.

The side margin portions 114 and 115 may include a first side margin portion 114 disposed on the fifth surface 5 of the body 110 and a second side margin portion 115 disposed on the sixth surface 6. That is, the side margin portions 114 and 115 may be disposed on opposite end surfaces of the body 110 in the third direction, respectively.

The side margin portions 114 and 115 may basically serve to prevent damage to the internal electrodes due to physical or chemical stress.

The side margin portions 114 and 115 may be formed by stacking ceramic green sheets to form a laminate, cutting the laminate so that the internal electrodes are exposed to the fifth and sixth surfaces 5 and 6 of the body, and then stacking a single dielectric layer or two or more dielectric layers on opposite side surfaces of the capacitance forming portion A in the width direction, in order to suppress a step due to the internal electrodes 121 and 122.

Referring to FIG. 6, Ga2/Ga1 may be 0.8 or more and less than 1.0 and Ga2/Gc1 may be 0.8 or more and less than 1.0 in which a1 is a central portion of the capacitance forming portion A, Ga1 is an average size of dielectric grains at a1, a2 is a boundary portion between the capacitance forming portion and the cover portion in the capacitance forming portion A, Ga2 is an average size of dielectric grains at a2, c1 is a boundary portion between the cover portion and the capacitance forming portion in each of the cover portions 112 and 113, and Gc1 is an average size of dielectric grains at c1.

In order to secure stable reliability of the multilayer electronic component 100, entire internal stress of the multilayer electronic component 100 needs to be decreased, and a stress distribution generated in a sintering process of the multilayer electronic component 100 needs to be significantly decreased.

When ratios of average sizes of dielectric grains for each position suggested in the present disclosure are satisfied, the internal stress may be decreased and the stress distribution generated in the sintering process may be significantly decreased. Therefore, capacitance dispersion may be suppressed, uniformity of a microstructure may be secured, and breakdown voltage characteristics and high-temperature lifespan characteristics may be improved.

When Ga2/Ga1 is less than 0.8, there may be a problem such as an electrical characteristic dispersion due to an increase in non-uniformity of grains between an inner portion of a dielectric and the outermost shell, and when Ga2/Ga1 is 1.0 or more, high-temperature acceleration reliability of the multilayer electronic component may be decreased due to a decrease in a local grain boundary fraction.

When Ga2/Gc1 is less than 0.8, a sintering start temperature may be increased due to a decrease in the average size of dielectric grains, such that a defect such as a crack may occur, and when Ga2/Gc1 is 1.0 or more, a compactness of dielectric grains in the cover portion may be decreased, such that moisture resistance reliability of the multilayer electronic component may be decreased.

That is, according to the present disclosure, the capacitance dispersion of the multilayer electronic component may be suppressed and the breakdown voltage and high-temperature lifespan characteristics of the multilayer electronic component may be improved by controlling Ga2 to be smaller than Ga1 and Gc1 and controlling a difference between Ga1 and Gc1 not to be large.

In particular, the boundary portion a2 between the capacitance forming portion and the cover portion in the capacitance forming portion may be a region having a great influence on the capacitance dispersion. According to the present exemplary embodiment, the capacitance dispersion may be more effectively suppressed by controlling the average size Ga2 of the dielectric grains at the boundary portion a2 between the capacitance forming portion and the cover portion in the capacitance forming portion in consideration of a correlation with Ga1 and Gc1.

In this case, the average sizes Ga1, Ga2, and Gc1 of the dielectric grains for each position may be sizes measured in a cross section of the body cut in the first and third direction. More specifically, the grain sizes Ga1, Ga2, and Gc1 of the of the dielectric grains for each position may be sizes measured in a cross section of the body cut in the first and third direction at the center of the body in the second direction.

Specifically, a1 may be a rectangular region disposed at the center of the body in the first and third directions, having a length of Ta/3 in the first direction, and having a length of Wa/3 in the third direction, a2 may be a rectangular region disposed at the center of the body in the third direction, having a length of Ta/6 in the first direction, and having a length of Wa/3 in the third direction, and c1 may be a rectangular region disposed at the center of the body in the third direction, having a length of Tc/6 in the first direction, and having a length of Wa/3 in the third direction, in which Wa is a length of the capacitance forming portion in the third direction, Ta is a length of the capacitance forming portion in the first direction, and Tc is a length of the cover portion in the first direction, which are measured in the cross section of the body cut in the first and third directions.

In addition, a2 and c1 may be disposed to abut on a boundary between the capacitance forming portion A and each of the cover portions 112 and 113. That is, as illustrated in FIG. 6, an upper side of the boundary portion a2 between the capacitance forming portion and the cover portion in the capacitance forming portion may be disposed to abut on the boundary between the capacitance forming portion A and each of the cover portions 112 and 113, and a lower side of the boundary portion c1 between the cover portion and the capacitance forming portion in the cover portion may be disposed to abut on the boundary between the capacitance forming portion A and each of the cover portions 112 and 113.

Meanwhile, when Ga2/Ga1 is 0.8 or more and less than 1.0, and Ga2/Gc1 is 0.8 or more and less than 1.0, each of Ga1, Ga2, and Gc1 does not need to be particularly limited. However, in order to further improve a breakdown voltage characteristic improving effect, Gc1 may be 200 nm or less. In addition, Ga1 and Ga2 may be 200 nm or less.

In an exemplary embodiment, the internal electrodes 121 and 122 may include the first internal electrodes 121 exposed to the third, fifth and sixth surfaces and the second internal electrodes 122 exposed to the fourth, fifth and sixth surfaces.

In order to miniaturize the multilayer electronic component and increase of capacitance of the multilayer electronic component, an effective area of the internal electrodes needs to be significantly increased (an effective volume fraction required for capacitance implementation needs to be increased). In order to implement such a significant increase in the effective area of the internal electrodes, the internal electrodes 121 and 122 may be exposed to the fifth and sixth surfaces the opposite end surfaces of the body 110 in the third direction to significantly increase areas of the internal electrodes in the width direction through a design without a margin, and the side margin portions 114 and 115 may be disposed on the fifth and sixth surfaces, respectively, to increase capacitance per unit volume and suppress the step in the width direction due to the internal electrodes. The side margin portions 114 and 115 may be formed by stacking ceramic green sheets to form a laminate, cutting the laminate so that the internal electrodes 121 and 122 are exposed to the fifth and sixth surfaces 5 and 6 of the body, and then stacking a single dielectric layer or two or more dielectric layers on the opposite end surfaces of the capacitance forming portion A in the width direction, in order to suppress the step due to the internal electrodes 121 and 122.

In an exemplary embodiment, [(Gm1+Gc1)/2]/Ga1 may be greater 0.8 and less than 1.5 in which m1 is a boundary portion between each of the side margin portions 114 and 115 and the capacity forming portion A in each of the side margin portions 114 and 115 and Gm1 is an average size of dielectric grains at m1.

In a case of forming the side margin portions 114 and 115 by a method of separately attaching the side margin portions 114 and 115, capacitance of the multilayer ceramic capacitor per unit volume may be increased, and the step due to the internal electrodes may be suppressed, but reliability of the multilayer ceramic capacitor may be decreased due to a decrease in a thickness of the side margin portions, or the like.

In particular, the side margin portions 114 and 115 may be in contact with opposite distal ends of the internal electrode in the third direction, respectively, and have a great influence on breakdown voltage characteristics. According to the present exemplary embodiment, the breakdown voltage characteristics may be more effectively improved by controlling the average size Gm1 of the dielectric grains at the boundary portion m1 between the side margin portion and the capacitance forming portion in the side margin portion in consideration of a correlation with Ga1 and Gc1.

When [(Gm1+Gc1)/2]/Ga1 is 0.8 or less, a compactness of dielectric grains in the side margin portion may be decreased, such that moisture resistance reliability of the multilayer electronic component may be decreased, and when [(Gm1+Gc1)/2]/Ga1 is 1.5 or more, non-uniformity of a dielectric thickness may increased due to electrode bowling at the outermost portion of the capacitance forming portion, such that a decrease in a breakdown voltage, a high-temperature acceleration reliability dispersion problem and the like may occur.

In this case, the average sizes Ga1, Ga2, Gc1, and Gm1 of the dielectric grains for each position may be sizes measured in a cross section of the body in the first and third direction. More specifically, the average sizes Ga1, Ga2, Gc1, and Gm1 of the dielectric grains for each position may be sizes measured in a cross section of the body cut in the first and third direction at the center of the body in the second direction.

Specifically, a1 may be a rectangular region disposed at the center of the body in the first and third directions, having a length of Ta/3 in the first direction, and having a length of Wa/3 in the third direction, a2 may be a rectangular region disposed at the center of the body in the third direction, having a length of Ta/6 in the first direction, and having a length of Wa/3 in the third direction, c1 may be a rectangular region disposed at the center of the body in the third direction, having a length of Tc/6 in the first direction, and having a length of Wa/3 in the third direction, and m1 may be a rectangular region disposed at the center of the body in the first direction, having a length of Ta/3 in the first direction, and having a length of Wm/6 in the third direction, in which Wa is a length of the capacitance forming portion in the third direction, Ta is a length of the capacitance forming portion in the first direction, Tc is a length of the cover portion in the first direction, and Wm is a length of the side margin portion in the third direction, which are measured in the cross section of the body cut in the first and third directions.

In addition, a2 and c1 may be disposed to abut on a boundary between the capacitance forming portion A and each of the cover portions 112 and 113, and m1 may be disposed to abut on a boundary between the capacity forming portion A and each of the side margin portions 114 and 115. That is, as illustrated in FIG. 6, an upper side of the boundary portion a2 between the capacitance forming portion and the cover portion in the capacitance forming portion may be disposed to abut on the boundary between the capacitance forming portion A and each of the cover portions 112 and 113, a lower side of the boundary portion c1 between the cover portion and the capacitance forming portion in the cover portion may be disposed to abut on the boundary between the capacitance forming portion A and each of the cover portions 112 and 113, and one side of the boundary portion m1 between the side margin portion and the capacitance forming portion in the side margin portion may be disposed to abut on a boundary between the capacitance forming portion A and each of the side margin portions 112 and 113.

Meanwhile, when Ga2/Ga1 is 0.8 or more and less than 1.0, Ga2/Gc1 is 0.8 or more and less than 1.0, and [(Gm1+Gc1)/2]/Ga1 is greater 0.8 and less than 1.5, each of Ga1, Ga2, Gc1, Gm1 does not need to be particularly limited. However, in order to further improve a breakdown voltage characteristic improving effect, Gm1 may be 180 nm or less.

Meanwhile, a method of controlling the average sizes Ga1, Ga2, Gc1, and Gm1 of the dielectric grains for each position does not need to be particularly limited. However, as a non-restrictive example, the average sizes Ga1, Ga2, Gc1, and Gm1 of the dielectric grains for each position may be controlled by making particle sizes of dielectric powders different from each other or adjusting a type and a content of additive, a sintering condition, and the like.

The internal electrodes 121 and 122 may be disposed alternately with the dielectric layer 111.

The internal electrodes 121 and 122 may include the first and second internal electrodes 121 and 122. The first and second internal electrodes 121 and 122 may be alternately disposed to face each other with each of the dielectric layers 111 constituting the body 110 interposed therebetween, and may be exposed to the third and fourth surfaces 3 and 4 of the body 110, respectively.

Referring to FIG. 3, the first internal electrodes 121 may be spaced apart from the fourth surface 4 and be exposed through the third surface 3, and the second internal electrodes 122 may be spaced apart from the third surface 3 and be exposed through the fourth surface 4. In addition, the first internal electrodes 121 may be exposed through the third, fifth and sixth surfaces 3, 5, and 6, and the second internal electrodes 122 may be exposed through the fourth, fifth and sixth surfaces 4, 5, and 6.

In this case, the first and second internal electrodes 121 and 122 may be electrically separated from each other by each of the dielectric layers 111 disposed therebetween.

The internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Meanwhile, a thickness to of each of the internal electrodes 121 and 122 does not need to be particularly limited.

However, in general, when each of the internal electrodes 121 and 122 is formed to have a small thickness less than 0.6 μm, in particular, when a thickness of each of the internal electrodes 121 and 122 is 0.45 μm or less, breakdown voltage and high-temperature lifespan characteristics of the multilayer electronic component may be deteriorated.

As described above, according to an exemplary embodiment in the present disclosure, the capacitance dispersion may be suppressed and the breakdown voltage and high-temperature lifespan characteristics of the multilayer electronic component may be improved by controlling the average sizes of the dielectric grains for each position, and excellent internal electrode connectivity and smoothness of the multilayer electronic component may thus be secured even when the thickness of each of the dielectric layers 121 and 122 is 0.45 μm or less.

Therefore, when the thickness of each of the internal electrodes 121 and 122 is 0.45 μm or less, an effect of the multilayer electronic component according to the present disclosure may become more remarkable, and miniaturization and a capacitance increase of the multilayer electronic component may be more easily achieved.

The thickness to of each of the internal electrodes 121 and 122 may refer to an average thickness of each of the first and second internal electrodes 121 and 122.

The average thickness of each of the internal electrodes 121 and 122 may be measured from an image obtained by scanning a cross section of the body 110 in the length and thickness directions (L-T) with a scanning electron microscope (SEM).

For example, with respect to any internal electrodes 121 and 122 extracted from an image obtained by scanning a cross section of the body 110 in the first and second directions (the length and thickness directions) cut at a central portion of the body 110 in the third direction (the width W direction) with the scanning electron microscope (SEM), thicknesses of the internal electrode may be measured at thirty points arranged at equal intervals in the length direction to obtain an average value of the measured thicknesses.

The external electrodes 131 and 132 are disposed on the third surface 3 and the fourth surface 4 of the body 110, respectively.

The external electrodes 131 and 132 may include first and second external electrodes 131 and 132 disposed on the third and fourth surfaces 3 and 4 of the body 110, respectively, and connected to the first and second internal electrodes 121 and 122, respectively.

Referring to FIG. 1, the external electrodes 131 and 132 may be disposed to cover opposite end surfaces of the side margin portions 114 and 115 in the second direction, respectively.

A structure in which the multilayer electronic component 100 includes two external electrodes 131 and 132 has been described in the present exemplary embodiment, but the number, shapes or the like, of external electrodes 131 and 132 may be changed depending on shapes of the internal electrodes 121 and 122 or other purposes.

Meanwhile, the external electrodes 131 and 132 may be formed of any material having electrical conductivity, such as a metal, a specific material of each of the external electrodes 131 and 132 may be determined in consideration of electrical characteristics, structural stability and the like, and the external electrodes 131 and 132 may have a multilayer structure.

For example, the external electrodes 131 and 132 may include, respectively, electrode layers 131a and 132a disposed on the body 110, and plating layers 131b and 132b each disposed on the electrode layers 131a and 132a.

As a more specific example of the electrode layers 131a and 132a, the electrode layers 131a and 132a may be fired electrodes including a conductive metal and glass or resin-based electrodes including a conductive metal or a resin.

Alternatively, the electrode layers 131a and 132a may have a form in which fired electrodes and resin electrodes are sequentially formed on the body. In addition, the electrode layers 131a and 132a may be formed in a manner of transferring a sheet including a conductive metal onto the body or be formed in a manner of transferring a sheet including a conductive metal onto a fired electrode.

The conductive metal included in the electrode layers 131a and 132a may be a material having excellent electrical connectivity, but is not particularly limited thereto. For example, the conductive metal may be one or more of nickel (Ni), copper (Cu), and alloys thereof.

The plating layers 131b and 132b may serve to improve mounting characteristics of the multilayer electronic component. A type of the plating layers 131b and 132b is not particularly limited. That is, each of the plating layers 131b and 132b may be a plating layer including one or more of Ni, Sn, Pd, and alloys thereof, and may be formed as a plurality of layers.

As a more specific example of the plating layers 131b and 132b, the plating layers 131b and 132b may be Ni plating layers or Sn plating layers, may have a form in which Ni plating layers and Sn plating layers are sequentially formed on the electrode layers 131a and 132a, respectively, or may have a form in which Sn plating layers, Ni plating layers, and Sn plating layers are sequentially formed. Alternatively, the plating layers 131b and 132b may include a plurality of Ni plating layers and/or a plurality of Sn plating layers.

A size of the multilayer electronic component 100 need not be particularly limited.

However, since the numbers of stacked dielectric layers and internal electrodes need to be increased by decreasing thicknesses of the dielectric layers and the internal electrodes in order to achieve both of the miniaturization and the capacitance increase of the multilayer electronic component, a reliability improving effect according to the present disclosure in a multilayer electronic component 100 having a size of 1005 (length×width: 1.0 mm×0.5 mm) or less may become more remarkable.

INVENTIVE EXAMPLE

Capacitance dispersion, breakdown voltage characteristics, a high-temperature lifespan, and uniformity of a microstructure were measured and evaluated while changing average sizes Ga1, Ga2, Gc1, and Gm1 of dielectric grains for each position, and measurement and evaluation results were shown in Table 1.

The average sizes Ga1, Ga2, Gc1, and Gm1 of the dielectric grains for each position were sizes measured in a cross section of the body cut in the first and third directions at the center of the body in the second direction, and grain sizes at a1, a2, c1, and m1 as illustrated in FIG. 6 were measured, and average values of the measured gain sizes were shown in Table 1.

The capacitance dispersion was measured under conditions of 1 kHz and alternating current (AC) 0.5 V using an LCR meter. The capacitance dispersion was expressed as ⊚ when the capacitance dispersion is 5% or less on the basis of an average value for 50 samples per Test No., was expressed as o when the capacitance dispersion is greater than 5% and is 10% or less on the basis of the average value, was expressed as Δ when the capacitance dispersion is more 10% and is 15% or less on the basis of the average value, and was expressed as × when the capacitance dispersion is 15% or more on the basis of the average value.

The breakdown voltage was evaluated by a method of applying a direct current (DC) voltage to samples over time with a breakdown voltage (BDV) measuring device manufactured by Keithely. The breakdown voltage was expressed as ⊚ when the breakdown voltage is greater than 10% of a rated voltage requirement of a required model, was expressed as o when the breakdown voltage is 0% or more and 10% or less of the rated voltage requirement, was expressed as Δ when the breakdown voltage is less than 0% and −10% or more of the rated voltage requirement, and was expressed as × when the breakdown voltage is less than −10% of the rated voltage requirement.

As for the high-temperature lifespan, a high-temperature load test was performed under a condition of 8V at 125° C. on 400 samples per Test No., and a time in which an insulation resistance is 10 KΩ or less was measured as a mean time to failure (MTTF). A long-term reliability life was expected in consideration of an acceleration factor of a required model, and a MTFF was calculated under a severe reliability condition that simulates a long-term reliability condition. The MTTF was expressed as ⊚ when the MTTF is greater than 10% of a long-term reliability request time, was expressed as o when the MTTF is 0% or more and 10% or less of the long-term reliability request time, was expressed as Δ when the MTTF is less than 0% and −10% or more of the long-term reliability request time, and was expressed as × when the MTTF is less than −10% of the long-term reliability request time.

The uniformity of the microstructure was evaluated by a method of performing pre-processing after ion milling, measuring the microstructure through a scanning electron microscope (SEM), and then measuring particle size with an optical microscope. The average sizes Ga1, Ga2, Gc1, and Gm1 of dielectric grains for each position were quantified, and were expressed as ⊚ when a grain growth rate with respect to a size of a start base material is 150% or less and a grain size difference at each position is 120 nm or less, were expressed as o when the grain growth rate is greater than 150% and is 250% or less and the grain size difference at each position is greater than 120 nm and is 160 nm or less, were expressed as Δ when the grain growth rate is greater than 250% and the grain size difference at each position is 200 nm or less, and were expressed as × when the grain growth rate is greater than 250% and the grain size difference at each position is greater than 200 nm.

TABLE 1

| Test No. | Ga1 | Ga2 | Gc1 | Gm1 | Ga2/Ga1 | Ga2/Gc1 | [(Gm1 + Gc1)/2]/Ga1 | Capacitance Dispersion | Breakdown Voltage | High-temperature Lifespan | Uniformity of Microstructure |
|---|---|---|---|---|---|---|---|---|---|---|---|
| 1 | 161 | 130 | 132 | 139 | 0.81 | 0.98 | 0.84 | ⊚ | ⊚ | ⊚ | ⊚ |
| 2 | 159 | 136 | 158 | 147 | 0.86 | 0.86 | 0.96 | ⊚ | ⊚ | ⊚ | ⊚ |
| 3 | 158 | 139 | 169 | 165 | 0.88 | 0.82 | 1.06 | o | ⊚ | ⊚ | o |
| 4 | 162 | 159 | 265 | 190 | 0.98 | 0.60 | 1.40 | o | Δ | o | o |
| 5 | 168 | 171 | 332 | 358 | 1.02 | 0.52 | 2.05 | X | X | Δ | X |
| 6 | 188 | 232 | 352 | 238 | 1.23 | 0.66 | 1.57 | Δ | Δ | Δ | Δ |
| 7 | 171 | 240 | 338 | 288 | 1.40 | 0.71 | 1.83 | Δ | X | X | X |
| 8 | 205 | 270 | 385 | 315 | 1.32 | 0.70 | 1.71 | Δ | Δ | Δ | Δ |
| 9 | 222 | 311 | 305 | 452 | 1.40 | 1.02 | 1.70 | X | X | Δ | Δ |
| 10 | 230 | 310 | 325 | 355 | 1.35 | 0.95 | 1.48 | Δ | X | X | o |
| 11 | 265 | 330 | 456 | 395 | 1.25 | 0.72 | 1.61 | Δ | Δ | Δ | Δ |
| 12 | 205 | 360 | 485 | 431 | 1.76 | 0.74 | 2.23 | X | X | X | X |
| 13 | 230 | 365 | 500 | 452 | 1.59 | 0.73 | 2.07 | X | X | X | X |
| 14 | 265 | 368 | 520 | 460 | 1.39 | 0.71 | 1.85 | Δ | X | X | X |

It can be seen that in Test Nos. 1 to 3, Ga2/Ga1 is 0.8 or more and less than 1.0 and Ga2/Gc1 is 0.8 or more and less than 1.0, such that capacitance dispersion is suppressed, the breakdown voltage and high-temperature lifespan characteristics, and the uniformity of the microstructure are excellent.

In Test No. 4, Ga2/Ga1 was 0.8 or more and less than 1.0, but Ga2/Gc1 was less than 0.8, such that the breakdown voltage characteristics were not excellent.

In Test No. 10, Ga2/Gc1 was 0.8 or more and less than 1.0, but Ga2/Ga1 was 1.0 or more, such that the capacitance dispersion was not excellent, and the breakdown voltage and high-temperature lifespan characteristics were poor.

In Test Nos. 5 to 9 and 11 to 14, both of conditions of Ga2/Ga1 and Ga2/Gc1 suggested in the present disclosure were not satisfied, such that the capacitance dispersion was large, and the breakdown voltage and high-temperature lifespan characteristics and the uniformity of the microstructure were poor.

Figure 7:
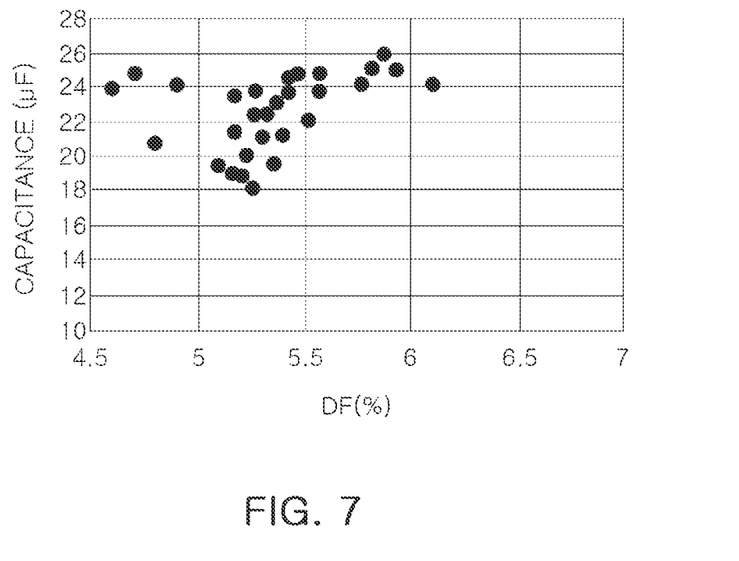
FIG. 7 is a graph illustrating capacitance and a dissipation factor (DF) of Test No. 5.
Figure 8:
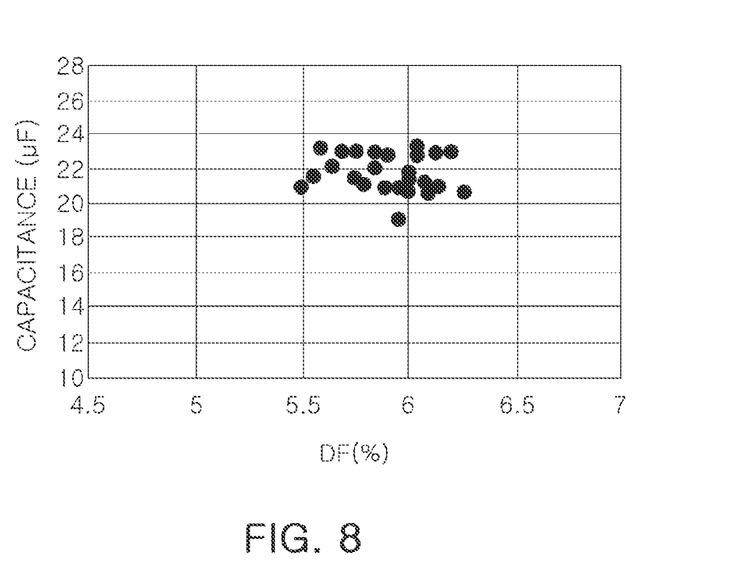
FIG. 8 is a graph illustrating capacitance and a DF of Test No. 1.
Figure 9:
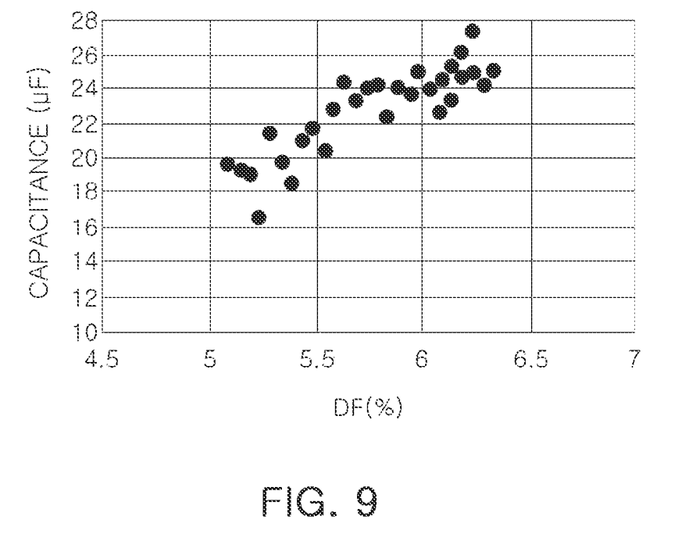
FIG. 9 is a graph illustrating capacitance and a DF of Test No. 12.

FIG. 7 is a graph illustrating capacitance and a dissipation factor (DF) of Test No. 5. FIG. 8 is a graph illustrating capacitance and a DF of Test No. 1. FIG. 9 is a graph illustrating capacitance and a DF of Test No. 12. It can be seen from FIG. 8 that in Test No. 1, a dispersion of the capacitance and the DF is suppressed. On the other hand, it can be seen from FIGS. 7 and 9 that in Test Nos. 5 and 12, a dispersion of the capacitance and the DF occurs.

As set forth above, according to an exemplary embodiment in the present disclosure, the reliability of the multilayer electronic component may be improved by controlling the dielectric grain sizes for each position.

In addition, the breakdown voltage characteristics of the multilayer electronic component may be improved.

Further, the capacitance dispersion of the multilayer electronic component may be suppressed.

In addition, the high-temperature lifespan characteristics of the multilayer electronic component may be improved.

While exemplary embodiments have been shown and described above, it will be apparent to those skilled in the art that modifications and variations could be made without departing from the scope of the present invention as defined by the appended claims.

What is claimed is:

1. A multilayer electronic component comprising:
a body including a plurality of dielectric layers and having first and second surfaces opposing each other in a first direction, third and fourth surfaces connected to the first and second surfaces and opposing each other in a second direction, and fifth and sixth surfaces connected to the first to fourth surfaces and opposing each other in a third direction;
side margin portions disposed on the fifth and sixth surfaces, respectively; and
external electrodes disposed on the third and fourth surfaces, respectively,
wherein the body includes a capacitance forming portion including internal electrodes disposed alternately with the dielectric layers and cover portions disposed on upper and lower surfaces of the capacitance forming portion in the first direction, respectively, and
Ga2/Ga1 is 0.8 or more and less than 1.0 and Ga2/Gc1 is 0.8 or more and less than 1.0, in which a1 is a central portion of the capacitance forming portion, a2 is a boundary portion between the capacitance forming portion and one of the cover portions in the capacitance forming portion, c1 is a boundary portion between the capacitance forming portion and the one of the cover portions in the one of the cover portions, Ga1 is an average size of dielectric grains at a1, Ga2 is an average size of dielectric grains at a2, and Gc1 is an average size of dielectric grains at c1.

2. The multilayer electronic component of claim 1, wherein a1 is a rectangular region disposed at a center of the body in the first and third directions, having a length of Ta/3 in the first direction, and having a length of Wa/3 in the third direction, a2 is a rectangular region disposed at a center of the body in the third direction, having a length of Ta/6 in the first direction, and having a length of Wa/3 in the third direction, and c1 is a rectangular region disposed at the center of the body in the third direction, having a length of Tc/6 in the first direction, and having a length of Wa/3 in the third direction, in which Wa is a length of the capacitance forming portion in the third direction, Ta is a length of the capacitance forming portion in the first direction, and Tc is a length of the one of the cover portions in the first direction, and Wa, Ta, and Tc are measured in a cross section of the body cut in the first and third directions.

3. The multilayer electronic component of claim 2, wherein a2 and c1 abut on a boundary between the capacitance forming portion and the one of the cover portions.

4. The multilayer electronic component of claim 3, wherein the cross section of the body cut in the first and third directions is a cross section of the body cut in the first and third directions at a center of the body in the second direction.

5. The multilayer electronic component of claim 1, wherein Gc1 is 200 nm or less.

6. The multilayer electronic component of claim 1, wherein the internal electrodes include first internal electrodes exposed to the third, fifth and sixth surfaces and second internal electrodes exposed to the fourth, fifth and sixth surface.

7. The multilayer electronic component of claim 6, wherein [(Gm1+Gc1)/2]/Ga1 is greater 0.8 and less than 1.5, in which m1 is a boundary portion between one of the side margin portions and the capacity forming portion in the one of the side margin portions and Gm1 is an average size of dielectric grains at m1.

8. The multilayer electronic component of claim 7, wherein a1 is a rectangular region disposed at a center of the body in the first and third directions, having a length of Ta/3 in the first direction, and having a length of Wa/3 in the third direction, a2 is a rectangular region disposed at the center of the body in the third direction, having a length of Ta/6 in the first direction, and having a length of Wa/3 in the third direction, c1 is a rectangular region disposed at the center of the body in the third direction, having a length of Tc/6 in the first direction, and having a length of Wa/3 in the third direction, and m1 is a rectangular region disposed at a center of the body in the first direction, having a length of Ta/3 in the first direction, and having a length of Wm/6 in the third direction, in which Wa is a length of the capacitance forming portion in the third direction, Ta is a length of the capacitance forming portion in the first direction, Tc is a length of the one of the cover portions in the first direction, Wm is a length of the one of the side margin portions in the third direction, and Wa, Ta, Tc, and Wm are measured in a cross section of the body cut in the first and third directions.

9. The multilayer electronic component of claim 8, wherein a2 and c1 abut on a boundary between the capacitance forming portion and the one of the cover portions, and m1 in the one of side margin portion abuts on a boundary between the capacity forming portion and the one of the side margin portions.

10. The multilayer electronic component of claim 9, wherein the cross section of the body cut in the first and third directions is a cross section of the body cut in the first and third directions at a center of the body in the second direction.

11. The multilayer electronic component of claim 7, wherein Gm1 is 180 nm or less.

12. The multilayer electronic component of claim 1, wherein a thickness of one of the plurality of dielectric layers is 0.45 μm or less.

13. The multilayer electronic component of claim 1, wherein a thickness of one of the internal electrodes is 0.45 μm or less.

14. A multilayer electronic component comprising:
- a body including a plurality of dielectric layers and having first and second surfaces opposing each other in a first direction, third and fourth surfaces connected to the first and second surfaces and opposing each other in a second direction, and fifth and sixth surfaces connected to the first to fourth surfaces and opposing each other in a third direction;
- side margin portions disposed on the fifth and sixth surfaces, respectively; and
- external electrodes disposed on the third and fourth surfaces, respectively,
- wherein the body includes a capacitance forming portion including internal electrodes disposed alternately with the dielectric layers and cover portions disposed on upper and lower surfaces of the capacitance forming portion in the first direction, respectively, [(Gm1+Gc1)/2]/Ga1 is greater 0.8 and less than 1, in which a1 is a central portion of the capacitance forming portion, c1 is a boundary portion between the capacitance forming portion and one of the cover portions in the one of the cover portions, m1 is a boundary portion between one of the side margin portions and the capacity forming portion in the one of the side margin portions, Ga1 is an average size of dielectric grains at a1, Gc1 is an average size of dielectric grains at c1, and Gm1 is an average size of dielectric grains at m1, and Ga2/Ga1 is 0.8 or more and less than 1.0, in which a2 is a boundary portion between the capacitance forming portion and one of the cover portions in the capacitance forming portion, and Ga2 is an average size of dielectric grains at a2.

15. The multilayer electronic component of claim 14, wherein a1 is a rectangular region disposed at a center of the body in the first and third directions, having a length of Ta/3 in the first direction, and having a length of Wa/3 in the third direction, c1 is a rectangular region disposed at the center of the body in the third direction, having a length of Tc/6 in the first direction, and having a length of Wa/3 in the third direction, and m1 is a rectangular region disposed at a center of the body in the first direction, having a length of Ta/3 in the first direction, and having a length of Wm/6 in the third direction, in which Wa is a length of the capacitance forming portion in the third direction, Ta is a length of the capacitance forming portion in the first direction, Tc is a length of the one of the cover portions in the first direction, Wm is a length of the one of the side margin portions in the third direction, and Wa, Ta, Tc, and Wm are measured in a cross section of the body cut in the first and third directions.

16. The multilayer electronic component of claim 15, wherein the cross section of the body cut in the first and third directions is a cross section of the body cut in the first and third directions at a center of the body in the second direction.

17. The multilayer electronic component of claim 14, wherein Gc1 is 200 nm or less.

18. The multilayer electronic component of claim 14, wherein Gm1 is 180 nm or less.

19. The multilayer electronic component of claim 14, wherein a thickness of one of the plurality of dielectric layers is 0.45 μm or less.

20. The multilayer electronic component of claim 14, wherein a thickness of one of the internal electrodes is 0.45 μm or less.

* * * * *